United States Patent [19]

Church et al.

[11] 3,942,623

[45] Mar. 9, 1976

[54] TRAFFIC CONTROLLER FOR MULTI-LANE CONVEYOR

[75] Inventors: Armistead S. Church, Midlothian; William H. Smick, III; Walter W. Marsh, both of Richmond, all of Va.

[73] Assignee: Philip Morris Incorporated, New York, N.Y.

[22] Filed: Nov. 27, 1974

[21] Appl. No.: 527,908

[52] U.S. Cl. ................................. 198/32; 198/79
[51] Int. Cl.² ........................................ B65G 47/26
[58] Field of Search ............ 198/32, 30, 40, 29, 79, 198/30

[56] References Cited
UNITED STATES PATENTS

| | | | |
|---|---|---|---|
| 1,579,545 | 4/1926 | Langsdorf | 198/79 X |
| 2,860,762 | 11/1958 | Alexander et al. | 198/79 X |
| 3,178,006 | 4/1965 | Nigrelli et al. | 198/32 |
| 3,536,180 | 10/1970 | Dubus | 198/40 X |
| 3,850,281 | 11/1974 | Focke et al. | 198/32 |

*Primary Examiner*—Robert J. Spar
*Assistant Examiner*—James M. Slattery
*Attorney, Agent, or Firm*—Watson Leavenworth Kelton & Taggart

[57] ABSTRACT

Apparatus is provided for each conveyor in a pair of merged conveyors inclusive of a member supported to engage conveyed articles prior to arrival thereof at a junction location common to the conveyor pair. A system is operative to selectively energize brakes associated with such article-engaging members to maintain the same in arresting or releasing relation with respect to engaged articles. The brake arrangement for one conveyor permits preselected movement of such member while the brake is energized to inform the system of conveyor loading.

11 Claims, 11 Drawing Figures

TRAFFIC CONTROLLER FOR MULTI-LANE CONVEYOR

FIELD OF THE INVENTION

This invention relates to article transport apparatus and control systems therefor.

BACKGROUND OF THE INVENTION

In warehousing and like article handling operations, need frequently arises for the collection at a common terminal of articles available at spaced terminals, for example, through the use of multiple article conveyors each extending from a preselected spaced terminal, with a reduced number of such conveyors directly serving the common terminal. Conveyors not directly serving the common terminal merge with other conveyors and feed articles selectively thereto as permitted by article flow conditions on the fed conveyor.

SUMMARY OF THE INVENTION

It is an object of the present invention to provide improved article transport apparatus of the merged multiple conveyor type and improved systems for controlling operation thereof.

In attaining the foregoing and other objects, the invention provides for the controlled merging of any pair of conveyors in such multiple conveyor type transport apparatus through the arrangement, for each conveyor in a merged conveyor pair, of a member supported to frontally engage conveyed articles prior to arrival thereof at a junction location common to the conveyor pair and of brake means energizable to maintain the member in arresting relation to the engaged article. The brake means for one conveyor permits preselected movement of its associated article engaging member while energized and control means are provided to selectively energize the brake means responsively to the states of switches set in accordance with the positions of the article engaging members. An order of priority is predetermined as between each merged conveyor pair to determine which of the two brake means is normally energized and the article-engaging member braked by the normally energized brake means is permitted such preselected movement.

The foregoing and other objects and features of the invention will be further understood from the following detailed discussion of preferred embodiments of the invention and from the drawings wherein like reference numerals identify like parts throughout.

The control system of the article transport apparatus of the invention now will be discussed by reference to the FIG. 1 block diagram thereof and the schematic illustrations of operation of the apparatus in FIGS. 2, 3, 4 and 5.

Figure 2:
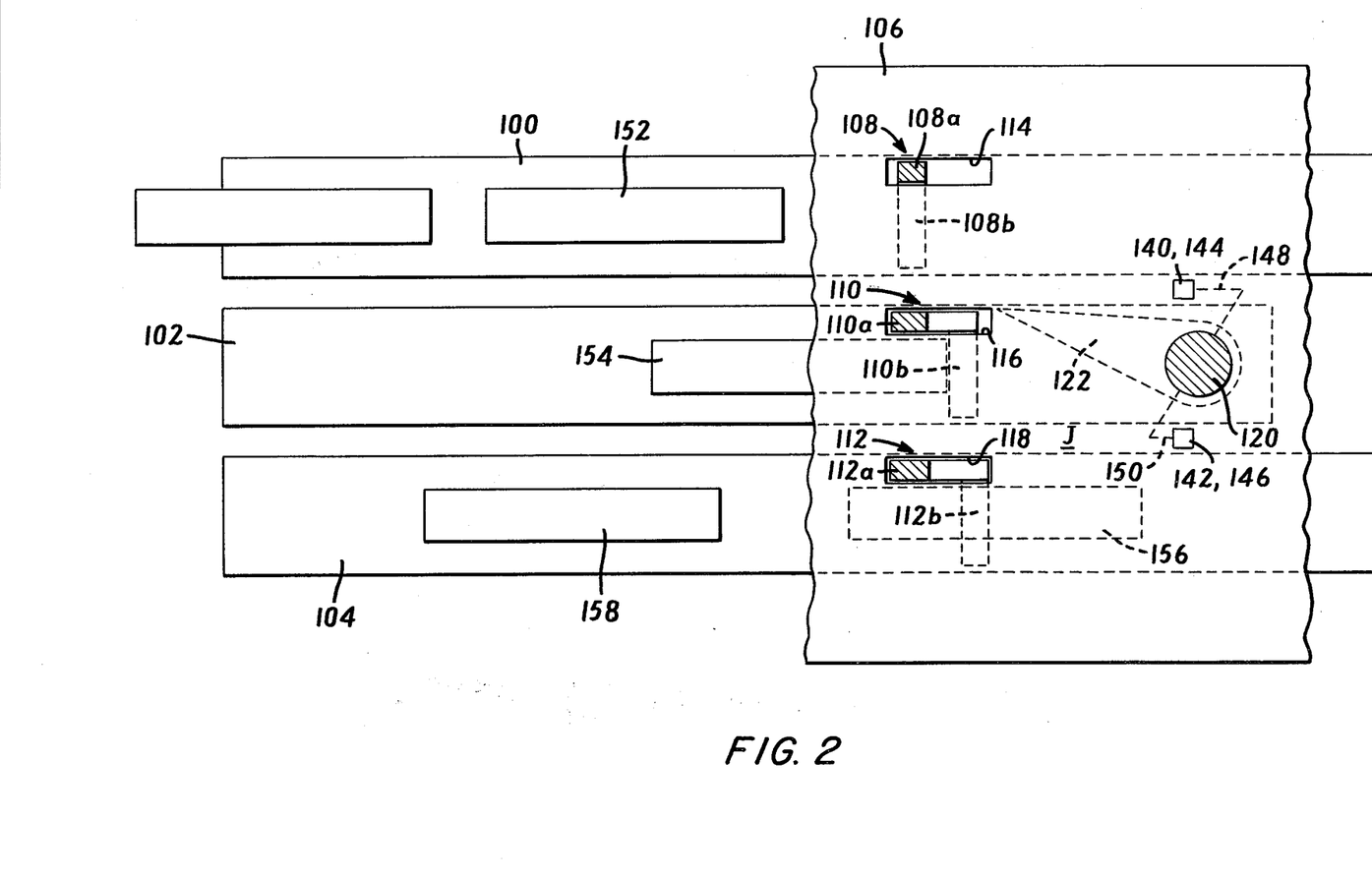
FIG. 2 is a schematic illustration of transport apparatus of the invention.

Referring to FIG. 2, conveyors 100 (left lane), 102 (center lane) and 104 (right lane) are shown extending below plate 106 which supports paddles 108 (left lane), 110 (center lane) and 112 (right lane) through plate slots 114, 116 and 118, respectively for pivotal movement relative to the conveyors. The paddles are L-shaped, including stem portions 108a, 110a and 112a and base portions 108b, 110b and 112b which are of extent substantially coextensive with the conveyor widths. Plate 106 also supports shaft 120 for rotative movement in positioning diverter 122 secured thereto. The diverter is shown in position for merger of lanes 102 and 104, i.e., a center lane-right lane merger, effected at the junction location J common thereto.

Figure 3:
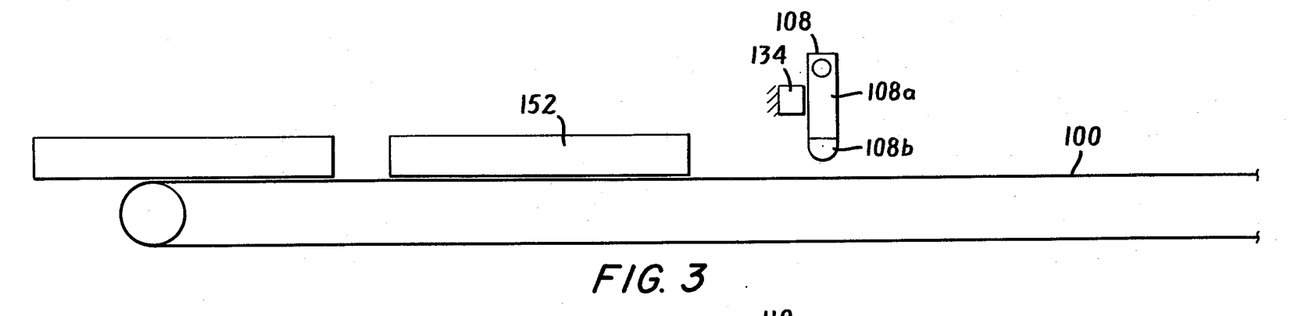
FIGS. 3 to 5 are explanatory of the activity of the FIG. 1 transport apparatus.
Figure 5:
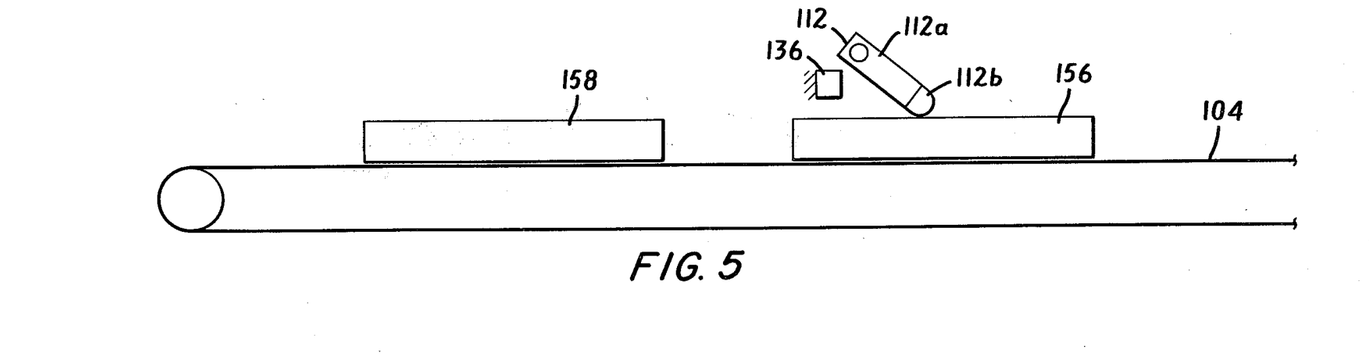

Left and right lane paddles 108 and 112 may reside in any of two operative positions in use. FIG. 3 shows paddle 108 in a down (DN) position. All paddles are gravity-biased to this position. Paddles 108 and 112 assume such DN position either when they are not article sensing, i.e., not article engaging, or when they are braked, whether sensing or not sensing an article. FIG. 5 shows paddle 112 in an up (UP) position. Paddles 108 and 112 assume such UP position when they are article sensing and unbraked.

Figure 4:
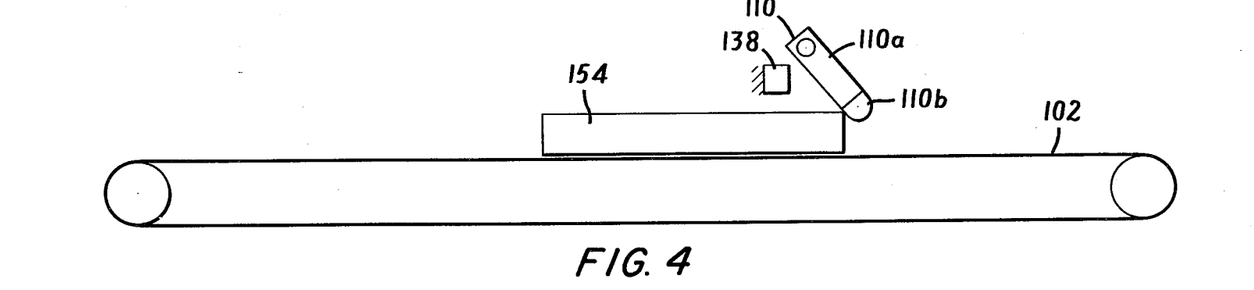

Center lane paddle 110 may reside in any of three operative positions in use. FIG. 4 shows paddle 110 in a partially up (PUP) position. Paddle 110 assumes this position when it is article sensing while braked. When paddle 110 is article sensing and unbraked, it assumes the UP position, as shown for paddle 112 in FIG. 5. Paddle 110 resides in the DN position, as shown for paddle 108 in FIG. 3, only when paddle 110 is not article sensing.

Figure 1:
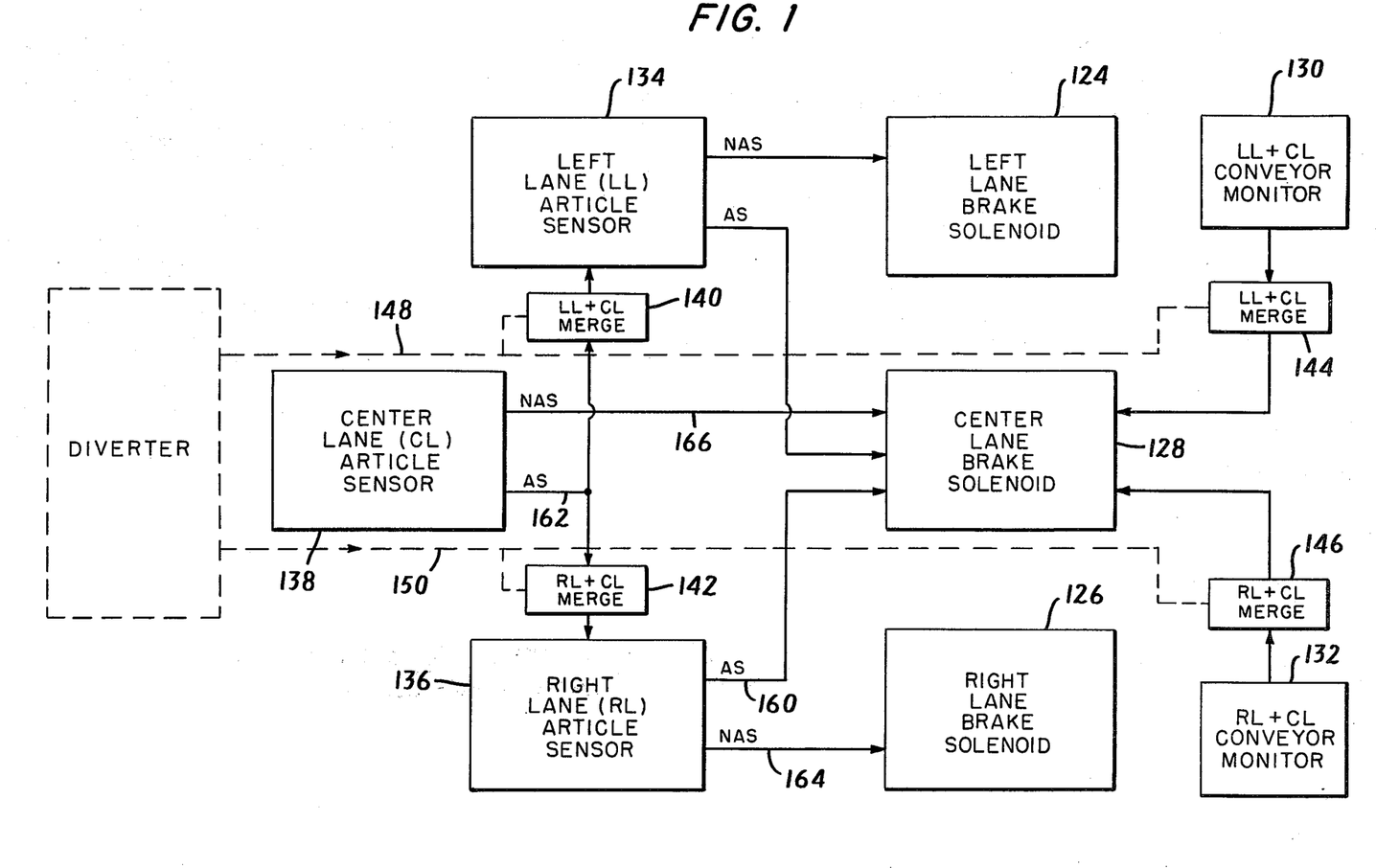
FIG. 1 is block diagram of the control system of transport apparatus of the invention.

Referring now to FIG. 1, the ultimately controlled elements thereof comprise left lane (LL) brake solenoid 124, right lane (RL) brake solenoid 126 and center lane (CL) brake solenoid 128.

These solenoids are controlled by the remaining circuit blocks in FIG. 1, comprising conveyor monitors 130 (LL + CL) and 132 (RL + CL), left lane (LL) article sensor 134, right lane (RL) article sensor 136, center lane (CL) article sensor 138 and switches 140, 142, 144 and 146 which are controlled by mechanical inputs 148 and 150 derived from the diverter.

Article sensor 134 includes switch means responsive to the positions assumed by paddle 108. Article sensors 136 and 138 include switch means responsive respectively to the positions assumed by paddles 112 and 110.

FIGS. 2–5 show conveyor 100 supporting article 152, conveyor 102 supporting article 154 and conveyor 104 supporting spaced articles 156 and 158. Article 156 leads article 154 and article 154 in turn leads article 158. This arrangement is conveniently selected for illustration of the operation of the control system of FIG. 1. Since lanes 102 and 104 are being merged, left lane brake solenoid 124 is free from control influence of the control system. Thus, left lane paddle 108 is unbraked throughout and, as article 152 engages paddle 108 in its DN position, paddle 108 moves under further advance of this article to its UP position and the article passes freely thereunder. In this connection, with the diverter in the illustrated position, it provides mechanical input 150 to close switches 142 and 146 (right and center lane, RL +CL, merge). Switches 140 and 144 (left and center lane, LL + CL, merge) are open in the absence of mechanical input 148.

Under the conditions shown in FIGS. 2–5, RL article sensor 136 of FIG. 1 energizes line 160. This occurs since RL paddle 112 is engaged by article 156 and thus displaced into its UP position, since switch 142 is closed, and snce CL article sensor 138 energizes line 162, paddle 110 being PUP. CL brake solenoid 128 is energized by line 160. RL brake solenoid 126 is unenergized since sensor 136 does not energize line 164. Article 156 proceeds to the right conveyor exit without interference from the center conveyor article 154. As article 156 passes beyond paddle 112, paddle 112 reassumes its DN position and sensor 136 no longer energizes line 160. CL brake solenoid 128 is thus deenergized, freeing paddle 110 for movement from its PUP to its UP position and permitting article 154 to be conveyed from the center lane conveyor to the right conveyor.

Sensor 136 now energized line 164 since switch 142 is closed and sensor 138 continues to energize line 162. At this time then, RL brake solenoid 126 becomes energized, preventing paddle 112 from leaving its DN position upon engagement thereof by article 158.

As article 154 passes beyond paddle 110, paddle 110 again reverts to its DN position and CL article sensor 138 energizes line 166, reenergizing CL brake solenoid 128. Since sensor 138 no longer energizes line 162, sensor 136 accordingly ceases energization of line 164 and RL brake solenoid 126 is thus deenergized, whereupon article 158 now passes under paddle 112.

In the course of the foregoing exemplary operation of the transport apparatus, monitor 132 serves to detect any malfunctioning in the operation of either of merged conveyors 102 and 104 and thereupon to energize brake solenoid 128 through switch 146 whereby the center lane conveyed articles are arrested by paddle 110 and prevented from reaching junction location J.

As will be appreciated, the control system of FIG. 1 is symmetrical in controlling its brake solenoids. Thus, in the alternate merger situation involving the center and left lanes, switches 142 and 146 are opened by repositioning of the diverter and switches 140 and 144 are closed. Thereupon LL sensor 134, LL solenoid 124 and LL + CL monitor 130 are operative in the same manner as above-discussed for their right lane counterpart circuit elements.

Figure 6:
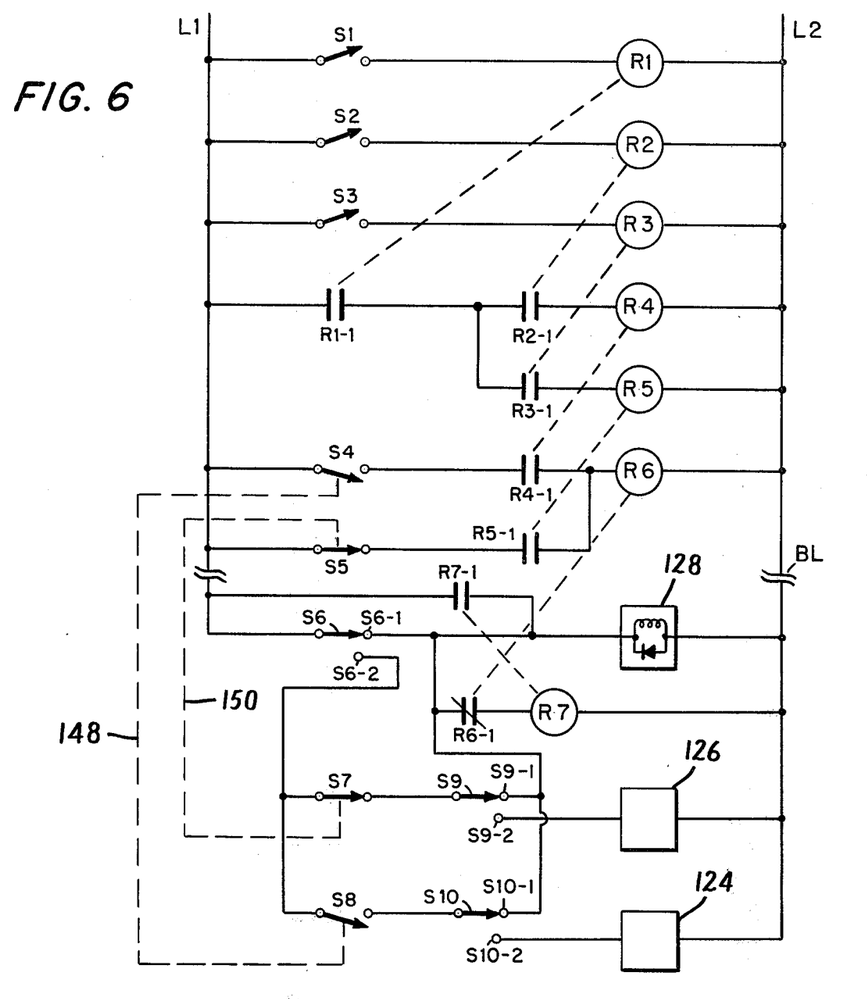
FIGS. 6 and 7 are schematic circuit diagrams of alternate arrangements of the control system of the invention.

FIG. 6 illustrates one embodiment of the control system of the invention. Lines L1 and L2 apply operating power to the system which is comprised of various branch circuits connected across these lines. Relay R1 and switch S1 function to monitor the center lane conveyor. S1 is closed at all times when the center lane conveyor is functioning properly and R1 is thereby energized, closing its associated relay contacts R1-1. Relay R2 and switch S2 function likewise for the left lane, relay contacts R2-1 being closed where the left lane conveyor is functioning properly. Relay R3 and switch S3 likewise provide closure of relay contacts R3-1 where the right lane conveyor is functioning properly. Based on the series connection of R1-1, R2-1 and R4 and the series connection of R1-1, R3-1 and R5, R4 is energized when both the center and right lane conveyors are functioning properly and R5 is energized when both the center and left lane conveyors are functioning properly.

Switches S4 and S5 correspond respectively to switches 144 and 146 of FIG. 1. In the center lane-right lane merger situation, S5 is closed as shown in FIG. 6 and, whereby relay contacts R5-1 of R5 are also closed indicating that both the center lane and right lane conveyors are functioning properly, relay R6 is energized through S5 and R5-1 and its relay contacts R6-1 are accordingly opened, thereby preventing energization of R7. Where either the center or right lane conveyors malfunctions, either R1 or R3 is deenergized; consequently deenergizing R5. With contacts R5-1 thereby opened, R6 is deenergized and R7 can be energized through contacts R6-1. On this event, contacts R7-1 of R7 are closed and center lane brake solenoid 128 is energized. As indicated in FIG. 6, for solenoid 128, the brake solenoids preferably comprise a winding across which a diode is connected to provide customary protection against inductive kickback and to delay braking action.

Switch S6 is the above-mentioned switch means of center lane sensor 138 and has a first state, providing continuity therethrough to switch terminal S6-1, when center lane paddle 110 is DN, and a second state, providing continuity therethrough to terminal S6-2, when paddle 110 is PUP or UP. Switches S7 and S8 correspond respectively to switches 142 and 140 of FIG. 1. In the center-right lane merger under discussion, S7 is closed and S8 is open. Switch S9 is the above-mentioned switch means of right lane sensor 136 and has a first state, providing continuity therethrough to terminal S9-2, when paddle 112 is DN and a second state, providing continuity therethrough to terminal S9-1, when paddle 112 is UP. Switch S10 is the above-mentioned switch means of left lane sensor 134 and has a first state, providing continuity therethrough to terminal S10-2, when paddle 108 is DN and a second state providing, continuity therethrough to terminal S10-1, when paddle 108 is UP.

Returning again to the illustrated example depicted in FIGS. 2–5, and considering that the switches of FIG. 6 are set in accordance therewith, S5 and S7 are closed, S6 is in its second state, article 154 displacing paddle 110 into its PUP position, and S9 is in its second state, article 156 placing paddle 112 in its UP position. The state of S10 is of no consequence snce S8 is open. A path of continuity is provided from L1 to solenoid 128 through S6-2, S7 and S9-1 and solenoid 128 is accordingly energized. Since S9 is in its second state, solenoid 126 is unenergized. As article 156 passes beyond paddle 112, S9 assumes its first state and solenoid 128 is deenergized. Solenoid 126 is concurrently energized through S6-2, S7 and S9-2. This condition persists until article 154 passes beyond paddle 110. On this occurrence, S6 changes to its first state whereupon solenoid 128 is energized directly, through S6-1 and solenoid 126 is deenergized.

As article 159 thereafter displaces paddle 112 from its DN to its UP position, S9 returns to its second state thereby readied to reenergize solenoid 128 if S6 changes state.

In practice, lines L1 and L2 are broken as at BL in FIG. 6 with the circuitry below the broken lines being supplied with d.c. voltage.

Figure 7:
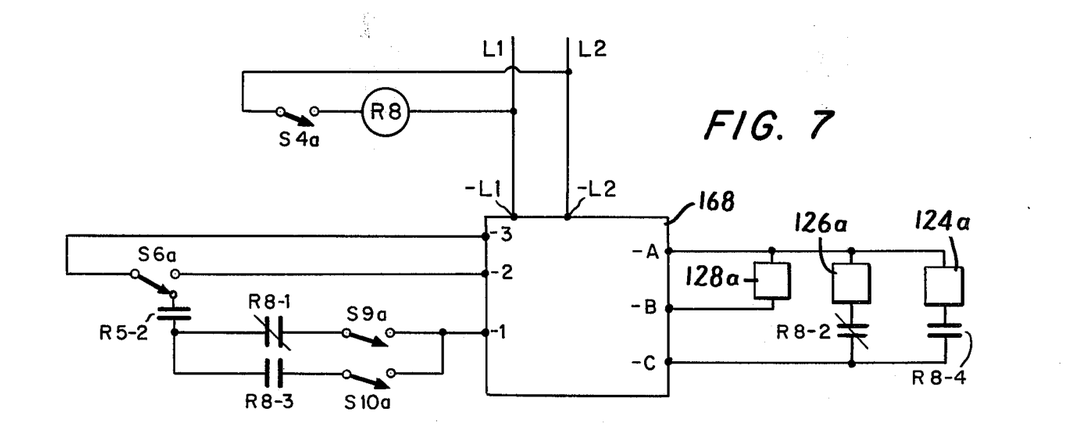

The alternate embodiment of the control system shown in FIG. 7 provides for isolation of the high current brake solenoids from the switch control circuitry by the use of a power switching unit 168 supplied with a.c. voltage at power terminals 168-L1 and 168-L2 from lines L1 and L2 and responsive to conditions at its input terminals 168-1, 168-2, and 168-3 to apply d.c. voltage selectively to its output terminals 168-A, 168-B and 168-C. A commercially-available unit of this type is the Regent NO. PR 521-11 which supplies switched 90v d.c. output when connected to 115v a.c. lines and has its terminals identified as above discussed.

Referring to FIG. 7, S4a is a switch diverter-operated as in the case of S4 of FIG. 6. S6a is a switch operated by center lane articles as was switch S6 of FIG. 6. Switches S9a and S10a are switches operated respectively by right and left lane articles as in the case of switches S9 andd S10 of FIG. 6. R8 is a relay having normally-closed contacts R8-1 and R8-2 and normally-open contacts R8-3 and R8-4. For simplicity, the circuitry of conveyor monitors 130 and 132 of FIGS. 1 and 6 is omitted from FIG. 7.

When input terminals 168-2 and 168-3 of unit 168 are connected by switch S6, the unit supplies voltage only across output terminals 168-A and 168-B and center lane brake solenoid 128a is thereby energized. When switches S4a and S6a are in the position shown therefor in FIG. 7, R8 is deenergized and, upon closure of switch S9a, continuity is provided between input terminals 168-1 and 168-3, whereupon unit 168 supplies voltage only across output terminals 168-A and 168-C, energizing right lane brake solenoid 126a through R8-2. When switch S4a is closed and switch 6a is in its shown position, contacts R8-3 are closed and, on closure of switch S10a, input terminals 168-1 and 168-3 of unit 168 are interconnected and the unit applies voltage only across output terminals 168-A and 168-C. In this case, with contacts R8-4 closed, left lane brake solenoid 124a is energized.

In its preferred application, the invention contemplates the use of elevators for supplying articles such as cigarette cartons to the center lane conveyor. When an outer lane malfunction occurs and R5 is thereby deenergized as above-discussed, there may be articles between the elevator (also thereupon deenergized) and the center lane paddle. If the center lane brake is on at the time of malfunction, as relay contacts R5-2 open, the system remains in such condition and the center lane brake is effectively latched. On the other hand, if the center lane brake is off when the malfunction occurs, it will not be energized until after the conveyor restarts.

In certain applications, the invention contemplates an override of the control system in the case of heavy traffic flow on the dominant conveyor. Thus, where a dominant conveyor is fed along its length by numerous tributaries, the invention contemplates the provision of sensor means for scanning dominant conveyor traffic upstream of a junction location and circuitry for locking the dominated conveyor paddle in its DN position where such traffic exceeds a predetermined volume.

In brief summary of the foregoing detailed discussion and in further explanation of the invention, the invention will be seen to contemplate means for engaging conveyed articles prior to conveyance thereof to a junction location, and energizable to arrest conveyance of engaged articles. Two such means are defined, e.g., by paddle 110 andd brake solenoid 128, and by paddle 112 and brake solenoid 126. With the right lane conveyor dominant over the center lane conveyor, control means (FIG. 6) energize such right lane means upon engagement of an article by the center lane means and concurrent non-engagement of an article by the center lane means and concurrent non-engagement of an article by the right lane means, i.e., solenoid 126 is energized where paddle 112 is DN and paddle 110 is not DN. The control means energizes the article-engaging means of the center conveyor when not energizing the counterpart left lane means. The paddles, i.e., article engaging members, are supported in a common (DN) position for frontally engaging articles and are moveable a predetermined extent (DN to UP) into non-frontal engagement with the articles to allow them to be conveyed to the junction location. Upon energization, the brake means associated with the dominant conveyor (right lane) maintains its article engaging member in the DN position. Upon energization of the center line brake means, its article sensing member is permitted to be moved by an engaging article from the DN position to an extent (PUP) less than said predetermined extent and still in frontally engaging arresting relation to the article. Switches are responsive in state assumed to the respective positions of the article engaging members and the control means is in turn operative in selectively energizing the brake means.

A preferred embodiment of the mechanism for supporting the article engaging members and associated braking units will now be discussed with reference to FIGS. 8–11.

Figure 8:
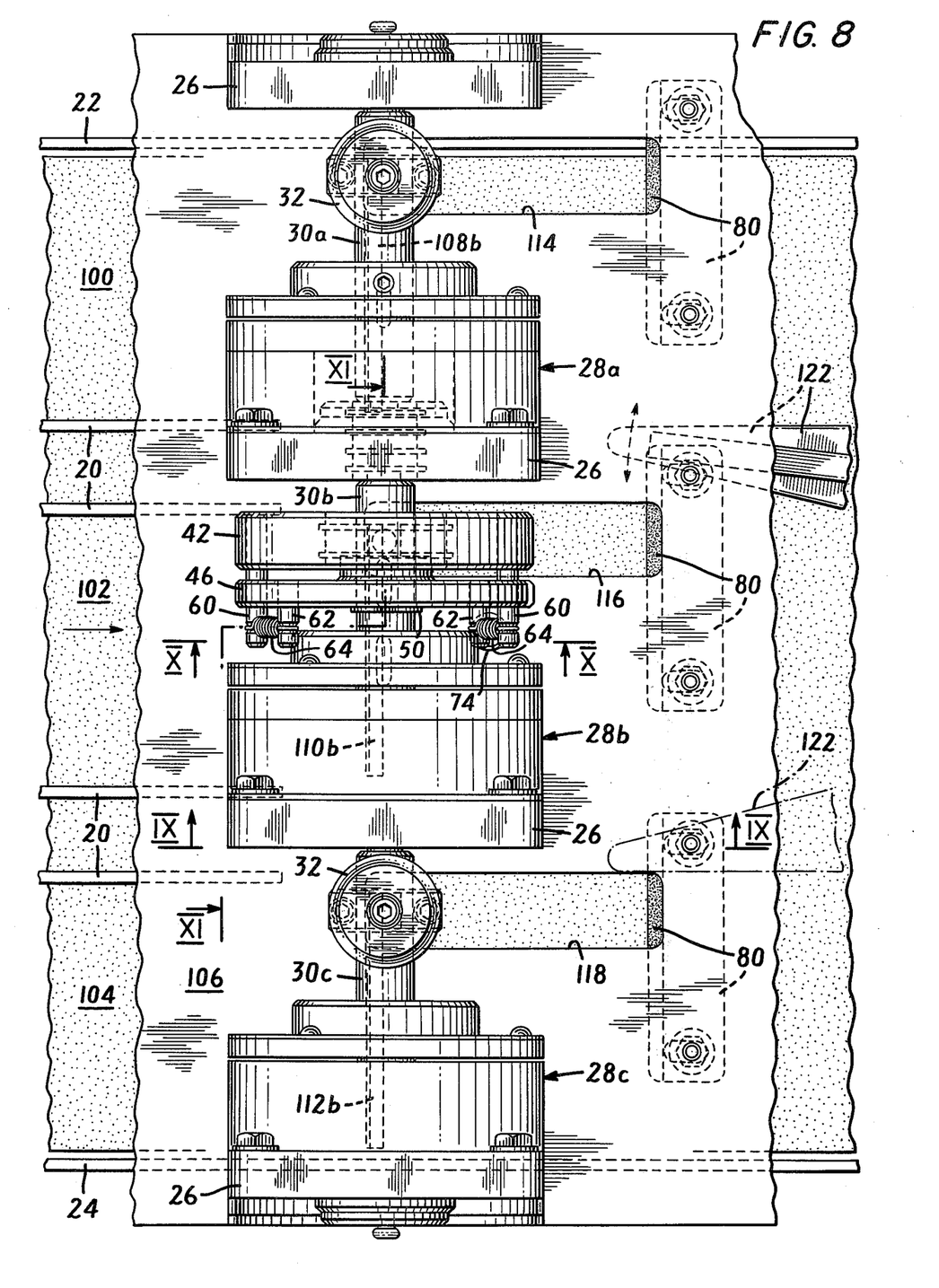
FIG. 8 is a fragmentary plan view of a preferred form of transport apparatus of the invention depicting the junction location at which selective transfer or merger of articles from a center lane conveyor to a right lane conveyor or a left lane conveyor occurs, there further being depicted the brake means and article arresting means associated with the respective conveyor lanes.
Figure 9:
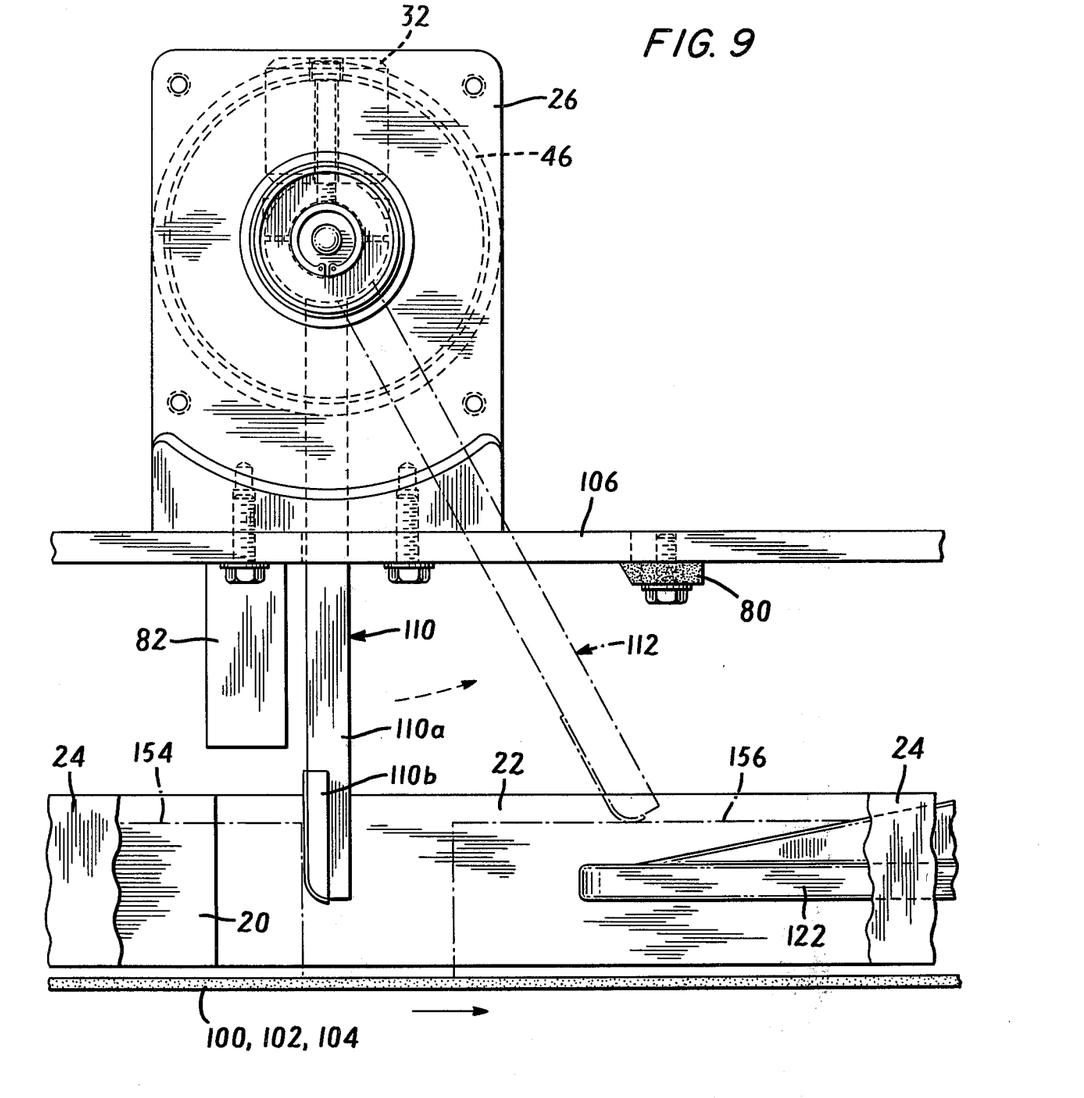
FIG. 9 is a side elevational view of the apparatus depicted in FIG. 7 taken along the line IX—IX.
Figure 10:
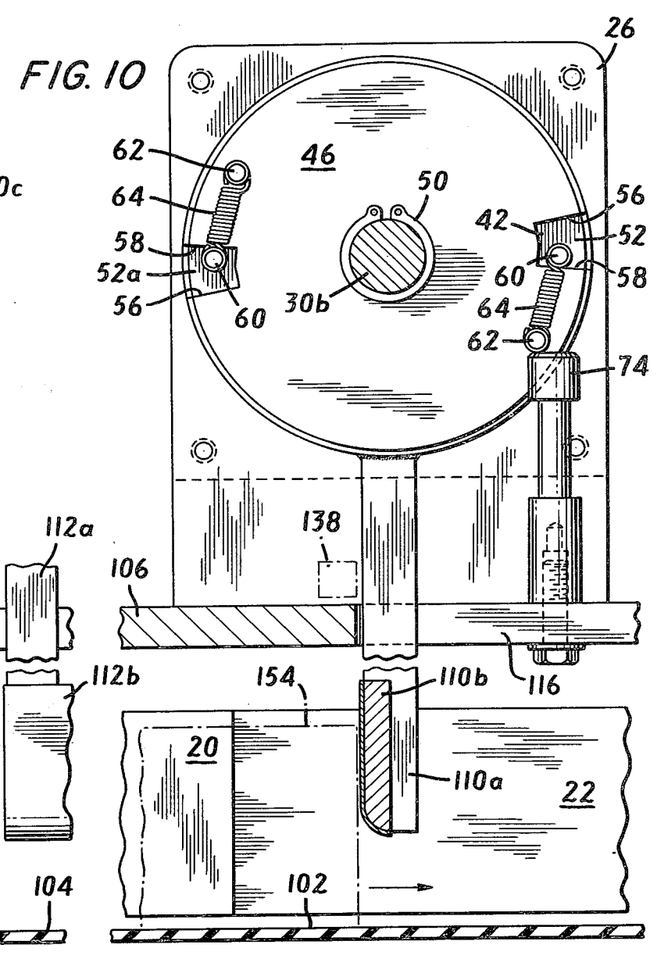
FIGS. 10 and 11 are sectional views as taken along the lines X—X and XI—XI, respectively, in FIG. 8.
Figure 11:
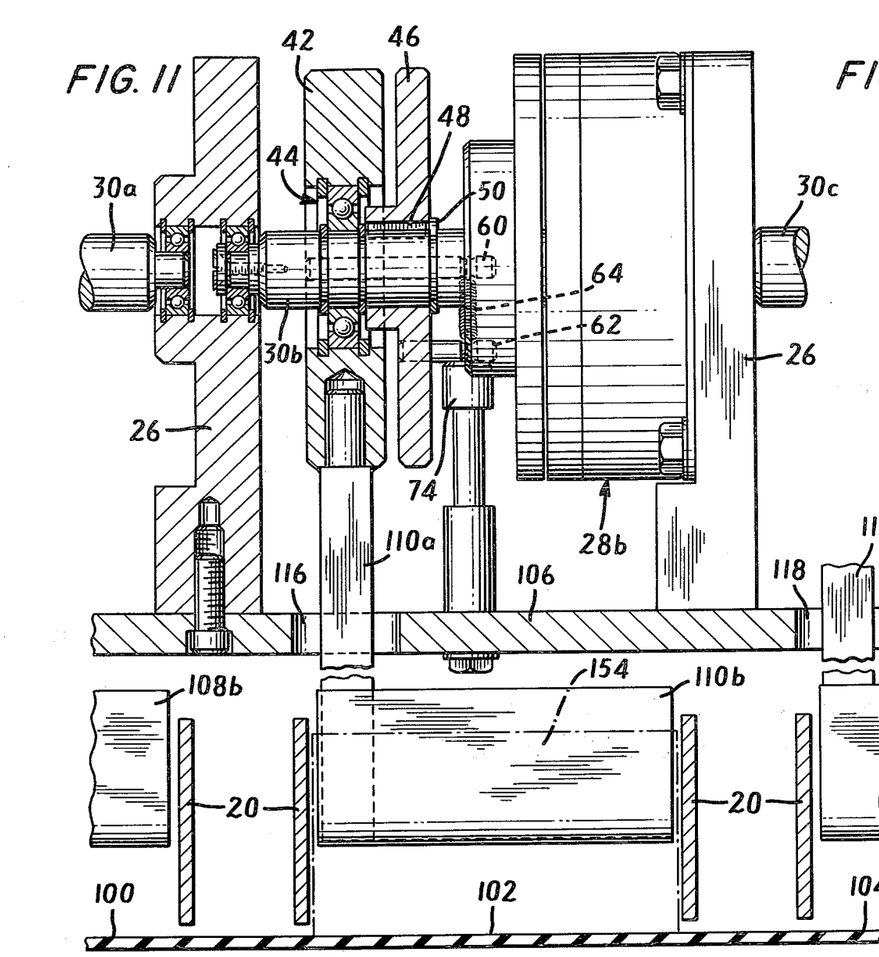

The depicted embodiment as indicated above is described in conjunction with transport of cigarette cartons but is should be understood that the invention is applicable to handling a wide range of articles of various sizes and shapes. As seen in FIG. 8, the apparatus includes left, center and right conveyors 100, 102 and 104 which could be individual conveyors or a single conveyor divided into the respective lanes by boundary plates 20, 22 and 24 it being understood that such boundary plates desirably being used whether a single or plural conveyor means is used, such boundary plates extending longitudinally of the conveyors a distance up to the common juncture J. Fixedly disposed above the conveyors in the region of juncture J is a supporting plate structure 106 on which is mounted the respective paddles 108, 110 and 112 there being provided on plate 106 the respective upright standards 26 on which is supported the soon to be described brake units 28a, 28b and 28c, and shafts 30a, 30b and 30c, the paddles being carried on the shafts with paddles 108 and 112 being fixedly connected to shafts 30a and 30c respectively for unitary rotative movement therewith, and the paddle 110 being loosely mounted on shaft 30b for rotative movement independently of the movement of such shaft. Each respective paddle 108, 110 and 112 includes a stem part 108a, 110a and 112a extending downwardly through respective plate slots 114, 116 and 118 and a base part 108b, 110b and 112b extending laterally substantially the full width of its associated conveyor lane. Paddles 108 and 112 are provided at the upper part thereof with counterweights 32 which facilitate return of such paddles from an UP to a DN position, the paddle 112 being in UP position in FIG. 9.

Each shaft 30a–30c is fixedly connected to its associated brake means 28a–28c so that when the brake means are energized, rotation of the shafts about their fixed axes which are transverse to to the direction of conveyor travel is prevented. As such and as earlier described, paddles 108 and 112 will operate in either a DN position to arrest article travel with the associated brake energized, or will if the brake means is is deenergized, rotatably move to an UP position under the impetus of article travel thereunder to permit further transport of the article to a desired downstream location.

Paddle 110 on the other hand includes on the stem part thereof an upper disc-like part 42 which is loosely mounted on shaft 30b as by means of bearing unit 44 so that such paddle is rotatably movable independently of the movement of shaft 30b. Thus paddle 110 can be moved from a DN to a PUP position while its associated brake means 28b is energized for the purpose of orienting switch means 138 in the manner and to the end described earlier. However with brake means 28b energized, paddle 110 is prevented from moving beyond the PUP position by the locking means to be described next.

A locking disc 46 is fixedly connected to shaft 30b as by means of key 48 in a position adjacent and spaced from disc part 42, there being provided a keeper 50 to prevent axial movement of disc 46. Disc 46 is provided with spaced slots 52, 52a at the periphery thereof, with the slots being widened and presenting pairs of opposed side surfaces 56, 58. Fixed to disc part 42 are a pair of pins 60 which extend axially of part 42 and through the slots 52, 52a with there also being provided a pair of pins 62 fixed to a face of disc part 42. Tension springs 64 are connected to each pair of pins 60, 62, which biasing or tension springs tend to rotate locking disc 46 and shaft 30b counter to the rotative movement of paddle 110 when such paddle moves from its common position. When paddle 110 is moved from a DN to PUP position and brake means 28b is energized, pins 60 which in the DN position of paddle 110 engage slot surfaces 58 will be caused to engage slot surfaces 56, and since locking disc 46 is fixed on shaft 30b and the said shaft is locked by brake means 28b, the paddle cannot rotate any further unless and until the brake means is deenergized. When brake means 28b is deenergized, article 154 (FIGS. 4 and 9) will then cause the paddle to rotate to an UP position, the pins 60 being in engagement with slot surfaces 56 carrying the locking disc 46 and shaft 30b along therewith in rotative movement.

In order to insure that when paddle 110 returns to a DN position, locking disc 46 returns to a predetermined angular relationship with the paddle as insures that the paddle can subsequently move to a PUP position and not be blocked by pins 60 remaining in engagement with slot surfaces 56 in the event the locking disc and shaft 30b were to overrotate, a detent 74 is fixed on plate 106 to engage the right side pin 62 (FIG. 10) and thus prevent overriding rotation of the locking disc.

Other features of the apparatus includes resilient bumpers 80 positioned at the underside of plate 106 to cushion any engagement of the paddles therewith during movement to an UP position, as well as barriers 82 to stop any article as may have been delivered to the conveyor in improperly oriented disposition, i.e., in edge upright rather than side upright position.

What is claimed is:

1. Article transport apparatus comprising: first and second conveyors, said second conveyor transporting articles to said first conveyor at a junction location therewith; first and second means for generating first and second output signals respectively on engaging articles on said first and second conveyors prior to conveyance thereof to said junction location and energizable by respective first and second control signals to arrest conveyance of such engaged articles; and control means receiving said first and second output signals for generating said first control signal upon occurrence of said second output signal and simultaneous non-occurrence of said first output signal, whereby said first means is energized to arrest articles on said first conveyor to prevent transport thereof to said junction location, and for generating said second control signal when said first control signal is not generated, whereby said second means is energized to arrest articles on said second conveyor to prevent transport thereof to said junction location.

2. The article transport apparatus claimed in claim 1 wherein said first and second means comprise first and second members supported in preselected position to respectively frontally engage articles on said first and second conveyors and moveable by said articles a predetermined extent into non-frontal engagement therewith to allow said articles to be conveyed to said junction location, said first means having brake means energized by said first control signal for maintaining said first member in said preselected position upon such article engagement thereby, and said second means having brake means energized by said second control signal for permitting articles to move said second member from said preselected position to an extent less than said predetermined extent.

3. The article transport apparatus claimed in claim 2 wherein said first and second means further comprise respective first and second switches being in first state upon respective disposition of said first and second members in said preselected position and in second state upon respective movement of said first and second members from said preselected position, said first and second means generating said first and second output signals respectively when said first and second switches are in said second state.

4. The article transport apparatus claimed in claim 2 wherein said control means further comprises circuit means for energizing said brake means of said second means upon malfunction of said first or said second conveyor means.

5. The article transport apparatus of claim 2 further comprising support structure fixed disposed a distance above said first and second conveyors, first and second shaft means mounted on said support structure for rotation about fixed axes extending transverse to the direction of conveyor travel, said first and second members being carried on said first and second shaft means, respectively, said first and second brake means being connected to said first and second shaft means respectively for preventing rotation of said shaft means where said brake means are energized, said first and second members extending downwardly of said support structure both when in the preselected position of each and when moved said predetermined extent.

6. The article transport apparatus of claim 5 in which said first member is fixedly connected to said first shaft means for unitary movement therewith, said second member being loosely mounted in said second shaft means for movement independently of the rotative movement of said second shaft means, there being means for locking said second member to said second shaft means when said second member is moved from said preselected position said lesser extent and said second brake means is energized.

7. The article transport apparatus of claim 6 in which said second member includes a disc part, said disc part being received loosely on said second shaft means, said locking means comprising a locking disc fixed to said second shaft means and having spaced widened slots at the periphery thereof, pins fixed to the disc part of said second member and extending through the slots in said locking disc, and biasing means carried on said locking disc and connected to said pins, said biasing means tending to rotate said locking disc and said second shaft means in a direction counter to the rotation of said second member when said second member is moved from said preselected position.

8. The article transport apparatus of claim 7 in which the slots in said locking disc have a pair of opposed side surfaces, the pins on said disc part engaging one side surface of an associated slot when said second member is in said preselected position, said pins engaging the other side surface of an associated slot when said second member is moved from said preselected position at least said lesser extent, whereby when said second brake means is energized further rotative movement of said second member is prevented, and when said second brake member is deenergized further rotative movement of said second member causes unitary movement of said second disc and said second shaft means with said second member.

9. The article transport apparatus of claim 7 further comprising detent means carried on said support structure and operative when said second member is in its preselected position to engage a companion structure on said second disc to maintain a fixed angular relationship between said second member disc part and said second disc.

10. The apparatus of claim 7 in which said biasing means comprises tension springs.

11. The article transport apparatus of claim 6 in which said first and second members each include a stem part fixed to the respective shaft means and a base part disposed below said plate, said plate having slots receiving the stems of said members, said bases extending substantially across the full expanse of each conveyor.

* * * * *